(12) United States Patent
Kobayashi et al.

(10) Patent No.: US 11,731,838 B2
(45) Date of Patent: Aug. 22, 2023

(54) ROLLER CONVEYOR DEVICE

(71) Applicant: NORITAKE CO., LIMITED, Nagoya (JP)

(72) Inventors: Yuta Kobayashi, Nagoya (JP); Kenichi Tanaka, Nagoya (JP)

(73) Assignee: NORITAKE CO., LIMITED, Nagoya (JP)

( * ) Notice: Subject to any disclaimer, the term of this patent is extended or adjusted under 35 U.S.C. 154(b) by 0 days.

(21) Appl. No.: 17/704,243

(22) Filed: Mar. 25, 2022

(65) Prior Publication Data

US 2022/0306396 A1    Sep. 29, 2022

(30) Foreign Application Priority Data

Mar. 26, 2021  (JP) ................................. 2021-054080

(51) Int. Cl.
*B65G 23/08*    (2006.01)
*B65G 39/10*    (2006.01)

(52) U.S. Cl.
CPC ............. *B65G 23/08* (2013.01); *B65G 39/10* (2013.01)

(58) Field of Classification Search
CPC ........ B65G 39/10; B65G 39/12; B65G 39/04; B65G 13/02; B65G 13/07; B65G 13/11; B65G 23/08; B65G 47/30; B65G 2201/02; B65G 2812/99; F27B 9/2407
See application file for complete search history.

(56) References Cited

FOREIGN PATENT DOCUMENTS

| WO | WO-0136302 A1 * | 5/2001 | ............... B65G 1/06 |
|----|----|----|----|
| WO | 2019/138887 A1 | 7/2019 | |
| WO | WO-2019138886 A1 * | 7/2019 | ............... F27B 9/24 |
| WO | WO-2019138887 A1 * | 7/2019 | ............... F27B 9/24 |

* cited by examiner

*Primary Examiner* — Bayan Salone
(74) *Attorney, Agent, or Firm* — Oliff PLC

(57) ABSTRACT

A roller conveyor device including a three-line conveyor for conveying objects that form at least three lines extending in a conveying direction. The three-line conveyor includes first conveyor rollers for conveying ones of the objects that form at least one central line of the at least three lines, second conveyor rollers for conveying ones of the objects that form at least one non-central line of the at least three lines, and third conveyor rollers for conveying ones of the objects that form another at least one non-central line of the at least three lines. A rotary shaft of each of the first, second and third conveyor rollers includes a shaft end portion having a projection portion that projects out from a conveying path in a widthwise direction of the conveying path, and the projection portion is to be driven so as to convey the objects in the conveying direction.

8 Claims, 6 Drawing Sheets

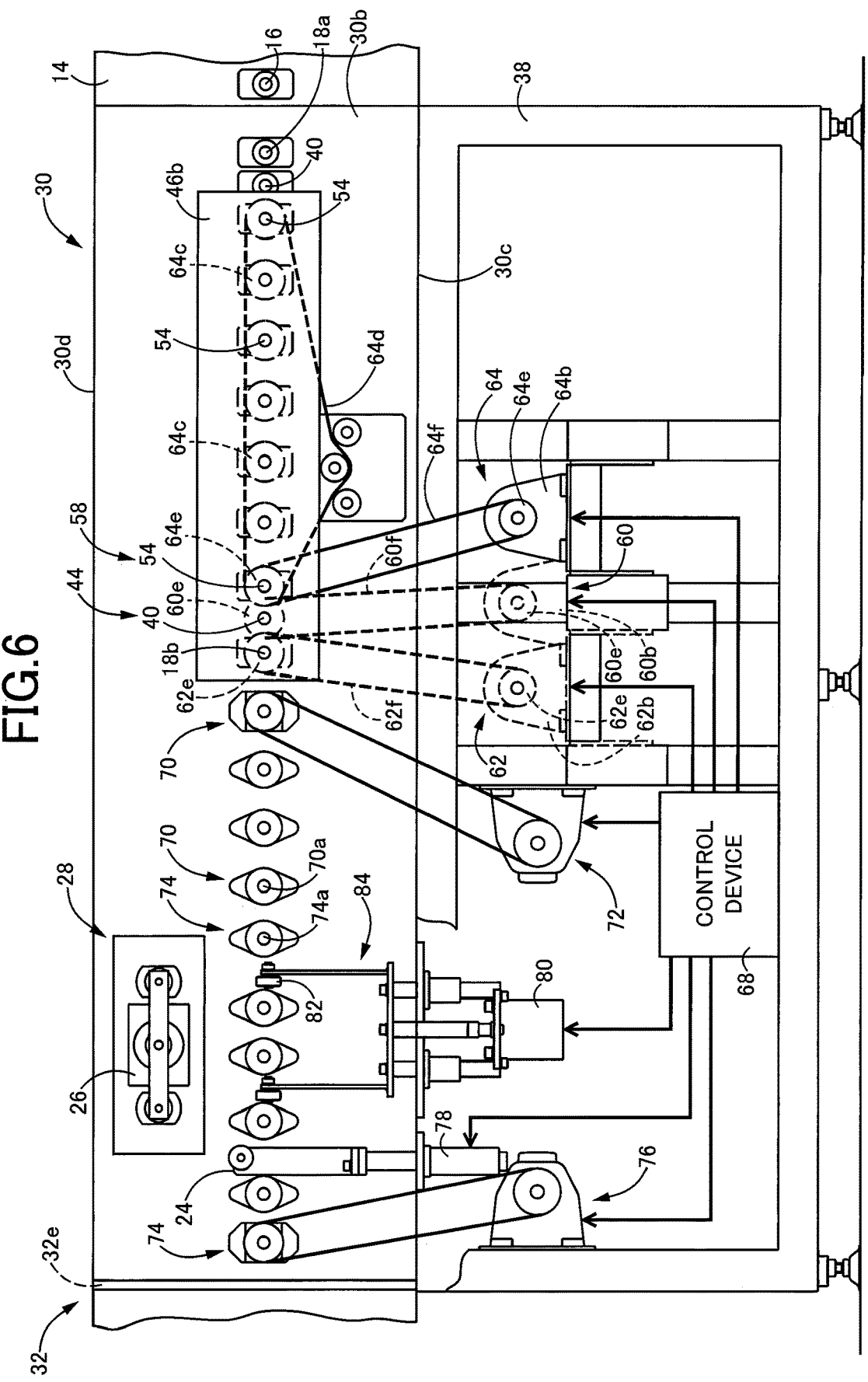

ROLLER CONVEYOR DEVICE

This application claims priority from Japanese Patent Application No. 2021-054080 filed on Mar. 26, 2021, the disclosure of which is hereby incorporated by reference in its entirety.

FIELD OF THE INVENTION

The present invention relates to a roller conveyor device including a three-line conveyor that is configured to convey a plurality of objects placed on conveyor rollers such that the plurality of objects are conveyed while forming at least three lines.

BACKGROUND OF THE INVENTION

There is known a roller conveyor device including a three-line conveyor provided with a plurality of conveyor rollers that are arranged. in parallel with a. predetermined interval distance between axes of each adjacent two of the conveyor rollers in a conveying direction so as to define a conveying path, wherein the three-line conveyor is configured to convey a plurality of objects placed on the conveyor rollers such that the plurality of objects are conveyed in the conveying direction while forming at least three lines each extending in the conveying direction. A roller conveyor device disclosed in WO/2019/138887 is an example of such a roller conveyor device.

In the above-described roller conveyor device, the three-line conveyor is provided to convey the plurality of objects forming three lines that consist of a central line and opposite-side lines located on respective opposite sides of the central line, such that ones of the objects forming the opposite-side lines are conveyed in outward directions away from ones of the objects forming the central line, so that it is possible to avoid the ones of the objects forming the opposite-side lines from being brought into contact with the ones of the objects forming the central line even if the ones of the objects forming the opposite-side lines are likely to be inclined toward the central line due to deflection of the conveyor rollers in a heating furnace.

SUMMARY OF THE INVENTION

By the way, in WO/2019/138887, there is no description referring to a conveyor-roller drive device for driving the conveyor rollers of the three-line conveyor configured to convey the plurality of objects forming the three lines each extending in the conveying direction. It might be possible to provide a conveyor-roller drive device on a lower side of the conveyor rollers, wherein the conveyor-roller drive device includes a sprocket fixed on a shaft end portion of one of the conveyor rollers of the three-line conveyor, a drive motor disposed on the lower side of the conveyor rollers, a speed reducer that is to be driven and rotated by the drive motor, a sprocket fixed on an output shaft of the speed reducer, a chain wound on the sprocket fixed on the shaft end portion of the one of the conveyor rollers and the sprocket fixed on the output shaft of the speed reducer, a plurality of sprockets fixed on shaft end portions of the respective conveyor rollers, and a chain wound on the plurality of sprockets, such that the conveyor rollers are rotated in synchronization with each other by operation of the drive motor.

However, if the above-described conveyor-roller drive device is used in a case in which the objects are to be conveyed in a highly clean environment, the conveyed objects could be contaminated by metallic fine powders generated by engagement or frictional contact between metal members such as the sprockets and the chain, whereby performance could be problematically reduced.

The present invention was made in view of the background art described above. It is therefore an object of the present invention to provide a roller conveyor device capable of suppressing contamination of conveyed objects, which could be caused due to the metallic fine powders.

Having made various studies for solving the above-described problem, the present inventors found that the contamination of the conveyed objects due to the metallic fine powders can be advantageously suppressed by employing an arrangement in which the conveyor rollers are disposed such that their shaft end portions have respective projection portions projecting out from a conveying path defined on the conveyor rollers and a chain is wound on sprockets that are fixed on the projection portions of the shaft end portions. The present invention was made based on this finding.

The object indicated above is achieved according to the following aspects of the present invention.

According to a first aspect of the invention, there is provided a roller conveyor device comprising: a three-line conveyor including a plurality of conveyor rollers that are arranged in parallel in a conveying direction so as to define a conveying path, the three-line conveyor being configured to convey a plurality of objects placed on the conveyor rollers such that the plurality of objects are conveyed in the conveying direction while forming at least three lines each extending in the conveying direction, and such that the at least three lines include at least one central line, at least one non-central line located on one of opposite sides of the at least one centerline in a widthwise direction of the conveying path, and another at least one non-central line located on the other of the opposite sides of the at least one central line in the widthwise direction of the conveying path, wherein the plurality of conveyor rollers include a plurality of first conveyor rollers including respective first rotary shafts that extend in the widthwise direction of the conveying path, each of the first rotary shafts being provided with a plurality of first support wheels which are disposed on a longitudinally central portion of the each of the first rotary shafts and which are located in a central portion of the conveying path between non-central portions of the conveying path in the widthwise direction of the conveying path, so as to support ones of the objects that form the at least one central line, wherein the plurality of conveyor rollers include a plurality of second conveyor rollers including respective second rotary shafts which extend in the widthwise direction of the conveying path and which are interposed between the first rotary shafts in the conveying direction, each of the second rotary shafts being provided with a plurality of second support wheels that are located in one of the non-central portions of the conveying path in the widthwise direction of the conveying path, so as to support ones of the objects that form the at least one non-central line, wherein the plurality of conveyor rollers include a plurality of third conveyor rollers including respective third rotary shafts which extend in the widthwise direction of the conveying path and which are interposed between the first rotary shafts in the conveying direction, each of the third rotary shafts being provided with a plurality of third support wheels that are located in the other of the non-central portions of the conveying path in the widthwise direction of the conveying path, so as to support ones of the objects that form the another at least one non-central line, wherein each of the first, second and third rotary shafts includes a shaft end portion having a projection portion that projects out from the conveying path in the widthwise direction, and wherein the three-line conveyor further includes a first rotation drive device configured to drive the projection portion of the shaft end portion of each of the first rotary shafts such that the first rotary shafts are rotated in synchronization with each other, a second rotation drive device configured to drive the projection portion of the shaft end portion of each of the second rotary shafts such that the second rotary shafts are rotated in synchronization with each other, and a third rotation drive device configured to drive the projection portion of the shaft end portion of each of the third rotary shafts such that the third rotary shafts are rotated in synchronization with each other.

According to a preferred arrangement of the first aspect of the invention, the first rotary shafts of the respective first conveyor rollers pass through the conveying path in the widthwise direction, wherein the second rotary shafts of the respective second conveyor rollers are located on one of opposite sides of the central portion of the conveying path in the widthwise direction, and wherein the third rotary shafts of the respective third conveyor rollers are located on the other of the opposite sides of the central portion of the conveying path in the widthwise direction.

According to a second aspect of the invention, in the roller conveyor device according to the first aspect of the invention, the plurality of first support wheels, which are disposed on each of the first rotary shafts of the first conveyor rollers, are spaced apart from each other, and each of the first support wheels has a diameter larger than a diameter of the each of the first rotary shafts, wherein the plurality of second support wheels, which are disposed on each of the second rotary shafts of the second conveyor rollers, are spaced apart from each other, and each of the second support wheels has a diameter larger than a diameter of the each of the second rotary shafts, wherein the plurality of third support wheels, which are disposed on each of the third rotary shafts of the third conveyor rollers, are spaced apart from each other, and each of the third support wheels has a diameter larger than a diameter of the each of the third rotary shafts, and wherein the diameter of each of the first support wheels is larger than the diameter of each of the second support wheels and the diameter of each of the third support wheels.

According to a third aspect of the invention, in the roller conveyor device according to the first or second aspect of the invention, a pair of roller support walls are provided to be fixedly provided on respective opposite sides of the conveying path in the widthwise direction, wherein each of the first and second rotary shafts passes through one of the roller support walls, such that the projection portion of the shaft end portion of each of the first and second rotary shafts is located outside the one of the roller support walls in the widthwise direction, and wherein each of the third rotary shafts passes through the other of the roller support walls, such that the projection portion of the shaft end portion of each of the third rotary shafts is located outside the other of the roller support walls in the widthwise direction.

According to a fourth aspect of the invention, in the roller conveyor device according to the third aspect of the invention, each of the first rotary shafts is rotatably supported, at longitudinally opposite end portions thereof one of which corresponds to the shaft end portion, by the roller support walls, and is rotatably supported at the longitudinally central portion thereof by a first roller-type support device, wherein each of the second rotary shafts is rotatably supported, at one of longitudinally opposite end portions thereof that corresponds to the shaft end portion, by the one of the roller support walls, and is rotatably supported at the other of the longitudinally opposite end portions thereof by a second roller-type support device, without the each of the second rotary shafts being supported at the other of the longitudinally opposite end portions thereof by the other of the roller support walls, and wherein each of the third rotary shafts is rotatably supported, at one of longitudinally opposite end portions thereof that corresponds to the shaft end portion, by the other of the roller support walls, and is rotatably supported at the other of the longitudinally opposite end portions thereof by a third roller-type support device, without the each of the third rotary shafts being supported at the other of the longitudinally opposite end portions thereof by the one of the roller support walls.

According to a fifth aspect of the invention, in the roller conveyor device according to any one of the first through fourth aspects of the invention, a separator conveyor is provided to separate the objects that have been conveyed by the three-line conveyor, by conveying the objects at a speed higher than a speed at which the objects have been conveyed by the three-line conveyor; and a conveyed-object aligning device is provided to cause the objects conveyed by the separator conveyor, to be brought into contact with a stopper, so as to align the objects in a row extending in a direction orthogonal to the conveying direction.

According to a sixth aspect of the invention, in the roller conveyor device according to the second aspect of the invention, each of the objects is a saggar box which is made of a ceramic material and which stores therein a material subjected to a heat treatment, wherein each of the first, second and third support wheels is made of a ceramic material.

According to a seventh aspect of the invention, in the roller conveyor device according to any one of the first through sixth aspects of the invention, a control device is provided to control the first, second and third rotation drive devices for conveying the objects that form the at least three lines on the conveying path, such that a positional difference between each adjacent ones of the objects, which are adjacent to each other in a direction orthogonal to the conveying direction, in the conveying direction is reduced.

In the roller conveyor device according the first aspect of the invention, each of the first, second and third rotary shafts includes a shaft end portion having a projection portion that projects out from the conveying path in the widthwise direction, wherein the three-line conveyor includes the first rotation drive device configured to drive the projection portion of the shaft end portion of each of the first rotary shafts such that the first rotary shafts are rotated in synchronization with each other, the second rotation drive device configured to drive the projection portion of the shaft end portion of each of the second rotary shafts such that the second rotary shafts are rotated in synchronization with each other, and the third rotation drive device configured to drive the projection portion of the shaft end portion of each of the third rotary shafts such that the third rotary shafts are rotated in synchronization with each other. Thus, the projection portions of the shaft end portions of the first, second and third rotary shafts, which project out from the conveying path in the widthwise direction, so that the first, second and third rotary shafts are driven and rotated by the first, second and third rotation drive devices in respective positions that are distant from the conveying path in the widthwise direction, thereby advantageously suppressing contamination of the objects, which could be caused due to metallic fine powders.

In the roller conveyor device according to the second aspect of the invention, the diameter of each of the first support wheels is larger than the diameter of each of the second support wheels and the diameter of each of the third support wheels. Owing to this arrangement, the objects conveyed by the second and third conveyor rollers tend to be separated away from the objects conveyed by the first conveyor rollers, so that it is possible to avoid the objects conveyed by the first conveyor rollers, from interfering with the objects conveyed by the second and third conveyor rollers.

In the roller conveyor device according to the third aspect of the invention, the pair of roller support walls are fixedly provided on the respective opposite sides of the conveying path in the widthwise direction, wherein each of the first and second rotary shafts passes through the one of the roller support walls, such that the projection portion of the shaft end portion of each of the first and second rotary shafts is located outside the one of the roller support walls in the widthwise direction, and wherein each of the third rotary shafts passes through the other of the roller support walls, such that the projection portion of the shaft end portion of each of the third rotary shafts is located outside the other of the roller support walls in the widthwise direction. Owing to this arrangement, the first, second and third rotary shafts are driven and rotated by the first, second and third rotation drive devices in respective positions that are distant and separated by a corresponding one of the roller support walls from the conveying path in the widthwise direction, thereby advantageously suppressing contamination of the objects, which could be caused due to metallic fine powders.

In the roller conveyor device according to the fourth aspect of the invention, each of the first rotary shafts is rotatably supported, at the longitudinally opposite end portions thereof one of which corresponds to the shaft end portion, by the roller support walls, and is rotatably supported at the longitudinally central portion thereof by the first roller-type support device, wherein each of the second rotary shafts is rotatably supported, at the one of the longitudinally opposite end portions thereof that corresponds to the shaft end portion, by the one of the roller support walls, and is rotatably supported at the other of the longitudinally opposite end portions thereof by the second roller-type support device, without the each of the second rotary shafts being supported at the other of the longitudinally opposite end portions thereof by the other of the roller support walls, and wherein each of the third rotary shafts is rotatably supported, at the one of the longitudinally opposite end portions thereof that corresponds to the shaft end portion, by the other of the roller support walls, and is rotatably supported at the other of the longitudinally opposite end portions thereof by the third roller-type support device, without the each of the third rotary shafts being supported at the other of the longitudinally opposite end portions thereof by the one of the roller support walls. Owing to this arrangement using the first, second and third roller-type support devices, it is possible to suppress deflection of the above-described other of the longitudinally opposite end portions of each of the second rotary shafts, deflection of the above-described other of the longitudinally opposite end portions of each of the third rotary shafts and deflection of the longitudinally central portion of each of the first rotary shafts, whereby deviation of the conveyed objects from the conveying direction due to the deflections can be suppressed.

In the roller conveyor device according to the fifth aspect of the invention, the separator conveyor is provided to separate the objects that have been conveyed by the three-line conveyor, by conveying the objects at the speed higher than the speed at which the objects have been conveyed by the three-line conveyor; and the conveyed-object aligning device is provided to cause the objects conveyed by the separator conveyor, to be brought into contact with the stopper, so as to align the objects in the row extending in the direction orthogonal to the conveying direction. Owing to this arrangement, the conveyed objects are aligned in the row extending in the direction orthogonal to the conveying direction, for example, before being accommodated into a replacement chamber.

In the roller conveyor device according to the sixth aspect of the invention, each of the objects is the saggar box which is made of the ceramic material and which stores therein the material subjected to the heat treatment, wherein each of the first, second and third support wheels is made of the ceramic material. Therefore, with the contact of the objects with the support wheels, only inorganic fine powders could be generated so that it is possible to avoid the objects and heat treatment material stored in each of the objects, from being contaminated by metallic fine powders.

In the roller conveyor device according to the seventh aspect of the invention, the control device is provided to control the first, second and third rotation drive devices for conveying the objects that form the at least three lines on the conveying path, such that the positional difference between each adjacent ones of the objects, which are adjacent to each other in the direction orthogonal to the conveying direction, in the conveying direction is reduced. Owing to provision of the control device, even if the objects are caused to meander, namely, are deviated from the conveying direction toward the direction orthogonal to the conveying direction, due to deflections of conveyor rollers, for example, in the heating furnace located in an upstream side of the three-line conveyor in the conveying direction, the positional difference between each adjacent ones of the objects adjacent to each other in the direction orthogonal to the conveying direction is reduced whereby the each adjacent ones of the objects are aligned in the row extending in the direction orthogonal to the conveying direction.

BRIEF DESCRIPTION OF THE DRAWINGS

FIG. 6 is a side view of the roller conveyor device of FIG. 1, as seen from a left side in FIG. 1.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
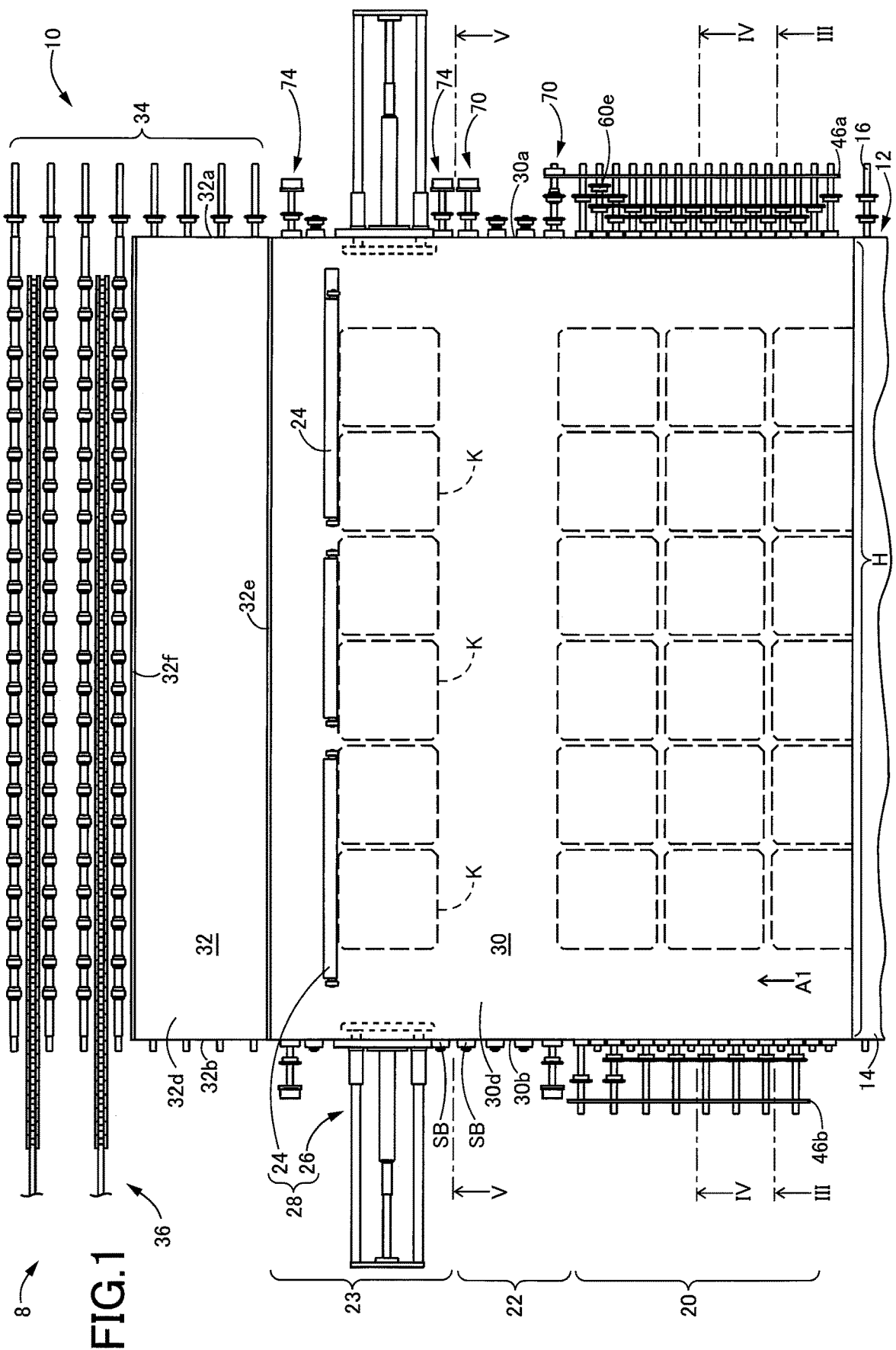
FIG. 1 is a plan view showing a state in which a roller conveyor device according to an embodiment of the present invention is attached to a heating furnace.

FIG. 1 is a plan view showing a state in which a heated-object conveyor apparatus 8 is attached to a heating furnace 12. The conveyor apparatus 8 includes a roller conveyor device 10 according to the embodiment of the invention and also a transfer conveyor 36. The heating furnace 12 is a heat treatment furnace of so-called "Roller Hearth Kiln" type. The heating furnace 12 includes a tunnel-shaped furnace body 14, a plurality of in-furnace conveyor rollers 16, a heater (not shown) and a rotation drive device (not shown). The furnace body 14 is constituted by an insulation material such as heat-resistant brick and ceramic board, and a casing that covers the insulation material. The in-furnace conveyor rollers 16 are provided to convey the objects K in the furnace body 14. The heater is provided in the furnace body 14 to heat the objects K. The rotation drive device is provided to drive the plurality of in-furnace conveyor rollers 16 such that the in-furnace conveyor rollers 16 are rotated at a constant rotational speed in synchronization with one another.

Each of the objects K, which are to be subjected to a heat treatment, is made of a ceramic material such as alumina, SiC, mullite, codelite, spinel codelite, magnesia and zirconia, and is constituted by a saggar box or the like storing therein rectangular ceramic plate and heat treatment material. In the present embodiment, each object K is constituted by the saggar box, as shown in FIG. 1. The saggar box stores therein the heat treatment material in the form of dielectric body, chip condenser including dielectric bodies and electrodes that are laminated or electrode material of lithium-ion battery, for example.

For causing the objects K to be continuously subjected to the heat treatment, for example, in the atmosphere or in an inert gas, each of the plurality of in-furnace conveyor rollers 16 is provided to extend in a horizontal direction and in a direction orthogonal to a longitudinal direction of the furnace body 14 (i.e., direction orthogonal to a conveying direction A1 in which the objects K are to be conveyed), and passes through the furnace body 14, such that the in-furnace conveyor rollers 16 are arranged with a predetermined interval distance between axes of each adjacent two of the in-furnace conveyor rollers 16 in the conveying direction A1. FIG. 1 shows an exit end portion of the furnace body 14 and one of the in-furnace conveyor rollers 16 which is disposed in the exit end portion. A plurality of lines of the objects K, which have been subjected to the heat treatment, are continuously conveyed at a constant speed from the exit end portion of the furnace body 14 to the roller conveyor device 10 provided in an exit of the furnace body 14.

Figure 2:
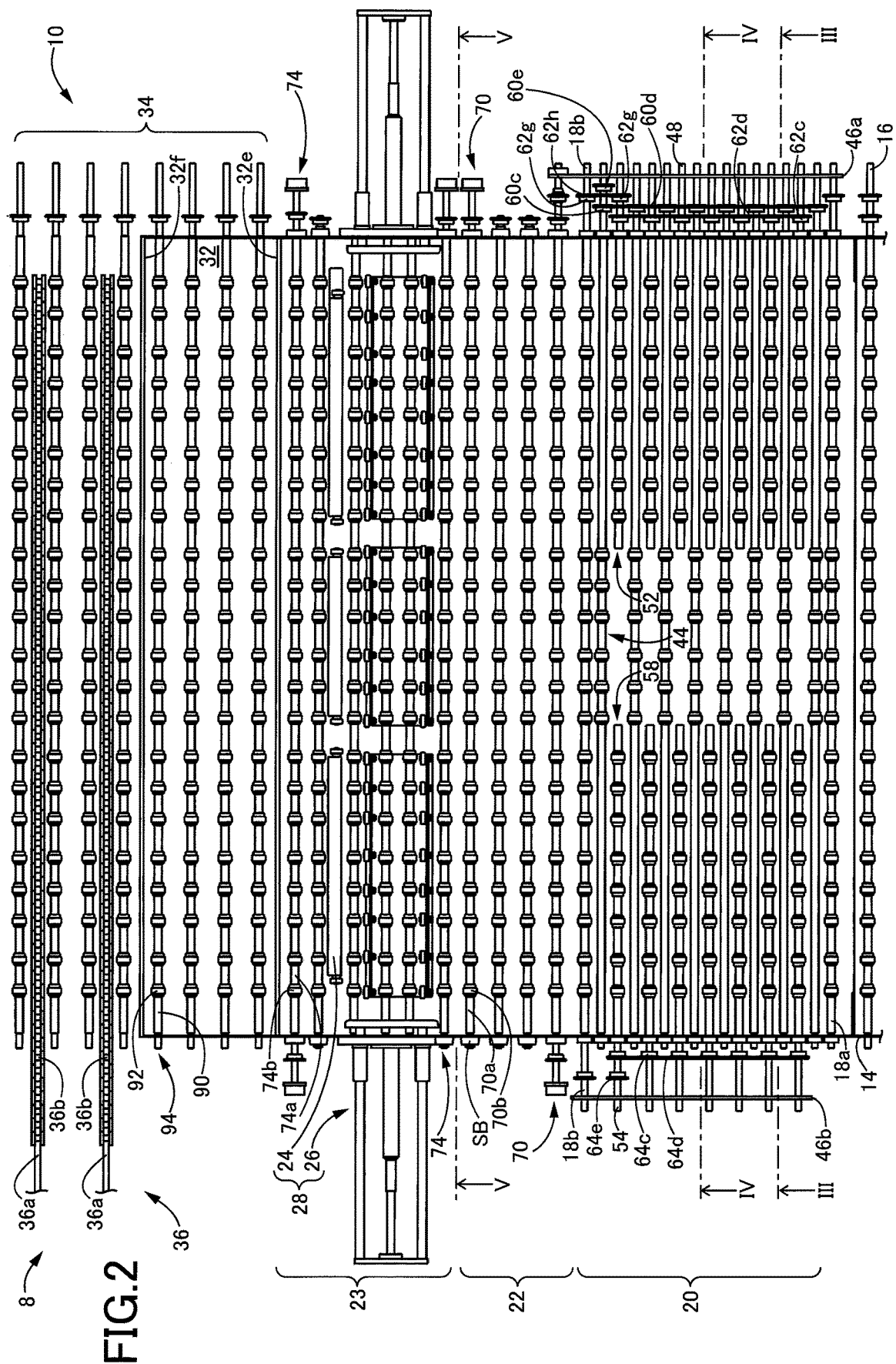
FIG. 2 is a plan view showing the roller conveyor device of FIG. 1, with a hood covering the roller conveyor device being removed.

The roller conveyor device 10 includes a hood 30 and a replacement chamber 32, The roller conveyor device 10 further includes a three-line conveyor 20, a separator conveyor 22, a take-out conveyor 23, a conveyed-object aligning device 28 and a sending-out conveyor 34 that are sequentially arranged in the conveying direction A1, i.e., in the longitudinal direction of the furnace body 14. The hood 30 is provided to air-tightly cover the three-line conveyor 20, separator conveyor 22, take-out conveyor 23 and conveyed-object aligning device 28, each of which serves as a furnace-speed conveyor, so as to maintain a gas atmosphere (e.g., atmosphere, nitrogen atmosphere, reduction atmosphere) of each object K, or so as to keep temperature of each object K. The replacement chamber 32 is provided to be contiguous to the hood 30 in the conveying direction A1 of the objects K. FIG. 2 is a plan view showing the roller conveyor device 10, with a ceiling wall 30d of the hood 30 covering the roller conveyor device 10 being removed.

The three-line conveyor 20 is configured to convey the plurality of objects K in the conveying direction A1, basically, at the same speed (furnace speed) as in the furnace body 14, while causing the objects K to form at least three lines (six lines in the present embodiment) each extending in the conveying direction A1. Each at least three objects K (each six objects K in the present embodiment) that are arranged in the same row (extending in the widthwise direction of the conveying path H) are conveyed at the same speed as that at which they are conveyed by the three-line conveyor 20 until reaching a certain position, and then are conveyed by the separator conveyor 22 at a higher speed after having reached the certain position whereby the each at least three objects K arranged in the same row are separated from the objects K that follow them. The take-out conveyor 23 is configured to convey each at least three objects K of the same row, which have been separated by the separator conveyor 22 from the following objects K, at a speed higher than the furnace speed, so as to move them into the replacement chamber 32.

Before being moved into the replacement chamber 32, each at least three objects K of the same row, which have been separated by the separator conveyor 22 from the following objects K, are aligned precisely in a row extending in a direction orthogonal to the conveying direction A1 by the conveyed-object aligning device 28 that includes a stopper 24 and a truing-up device 26. In this instance, the each at least three objects K are clamped in the direction orthogonal to the conveying direction A1 by the truing-up device 26 so as to be brought into close contact with one another, while being held in contact with the stopper 24 that extends in the direction orthogonal to the conveying direction A1. The sending-out conveyor 34 is configured to send the each at least three objects K, which are aligned in the row in the replacement chamber 32, out from the replacement chamber 32 at a speed higher than the furnace speed.

The transfer conveyor 36 is configured to receive each at least three objects K aligned in the row, and to transfer them to an inversion device, for example, maintaining the row (single row) of the each at least three objects K which extends in the direction orthogonal to the conveying direction A1.

Figure 3:
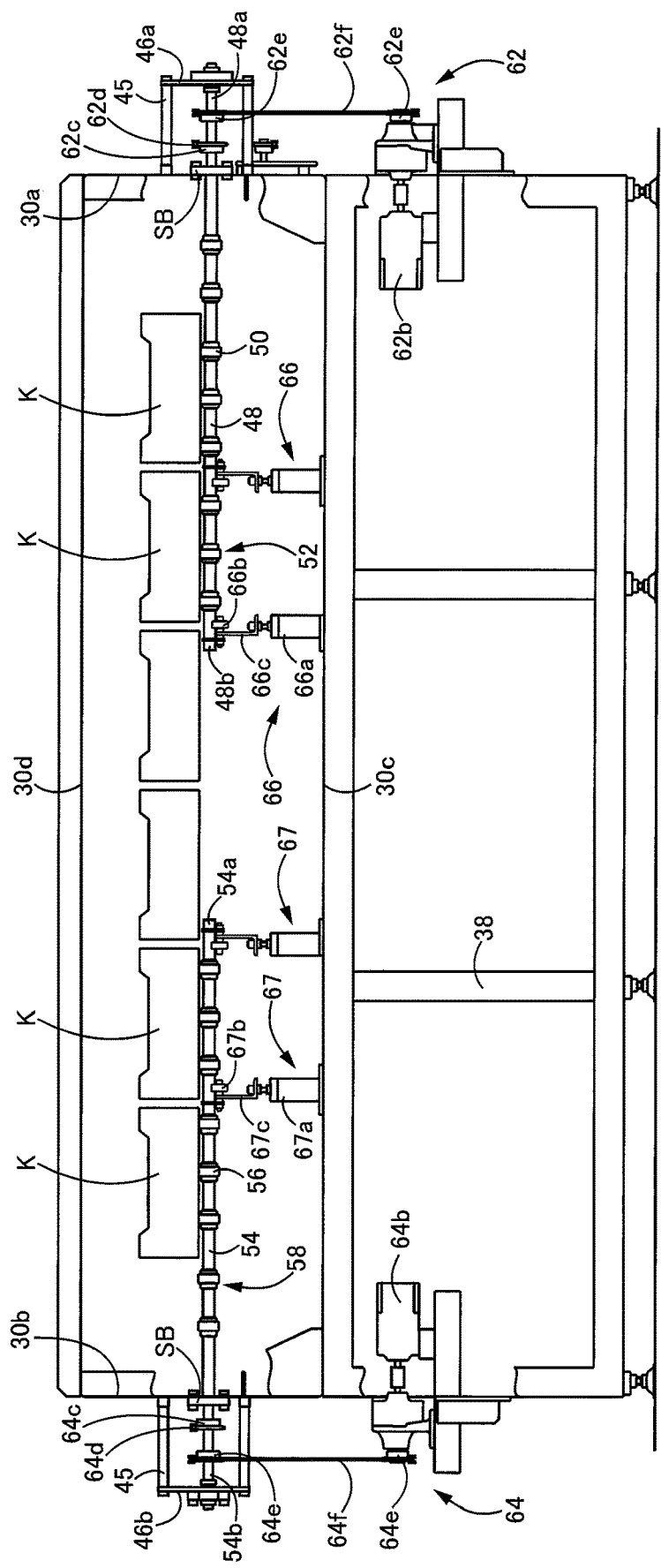
FIG. 3 is a cross sectional view taken along line III-III in FIG. 2.

As shown in FIG. 3, FIG. 4, FIG. 5 and FIG. 6, the three-line conveyor 20, separator conveyor 22, take-out conveyor 23, conveyed-object aligning device 28, hood 30, replacement chamber 32 and sending-out conveyor 34 are supported by a frame 38. As shown in FIG. 2 and FIG. 3, the hood 30 having a tunnel shape includes a pair of side walls 30a, 31b and a bottom wall 30c in addition to the above-described ceiling wall 30d, and is air-tightly connected to the exit of the furnace body 14. As shown in FIG. 1 and FIG. 6, the replacement chamber 32 having a tunnel shape includes a pair of side walls 32a, 32b, a bottom wall 32c and a ceiling wall 32d. The replacement chamber 32 further includes an entrance shutter 32e for opening and closing an opening on side of the furnace body 14, and an exit shutter 32f for opening and closing an opening on side opposite to the furnace body 14. The conveying path of the objects K is defined between the pair of side walls 30a, 30b and between the pair of side walls 32a, 32b.

As shown in FIG. 2. and FIG. 6, the three-line conveyor 20 includes a pair of conveyor rollers in the form of an upstream-side furnace-speed conveyor roller 18a and a downstream-side conveyor roller 18b that are to be rotated at the same speed as the in-furnace conveyor roller 16, a plurality of first conveyor rollers 44, a first rotation drive device 60 configured to drive and rotate the first conveyor rollers 44, a plurality of second conveyor rollers 52, a second rotation drive device 62 configured to drive and rotate the second conveyor rollers 52, a plurality of third conveyor rollers 58, and a third rotation drive device 64 configured to drive and rotate the third conveyor rollers 58, wherein the first, second and third conveyor rollers 44, 52, 64 are located between the upstream-side furnace-speed conveyor roller 18a and the downstream-side conveyor roller 18b in the conveying direction A1. Like each of the in-furnace conveyor rollers 16, each of the upstream-side furnace-speed conveyor roller 18a and the downstream-side conveyor roller 18b is constituted by a rotary shaft and a plurality of support wheels (22 support wheels in the present embodiment) disposed on the rotary shaft, wherein the support wheels of the downstream-side conveyor roller 18b are free rollers that are to be rotatable relative to the rotary shaft of the downstream-side conveyor roller 18b.

Figure 4:
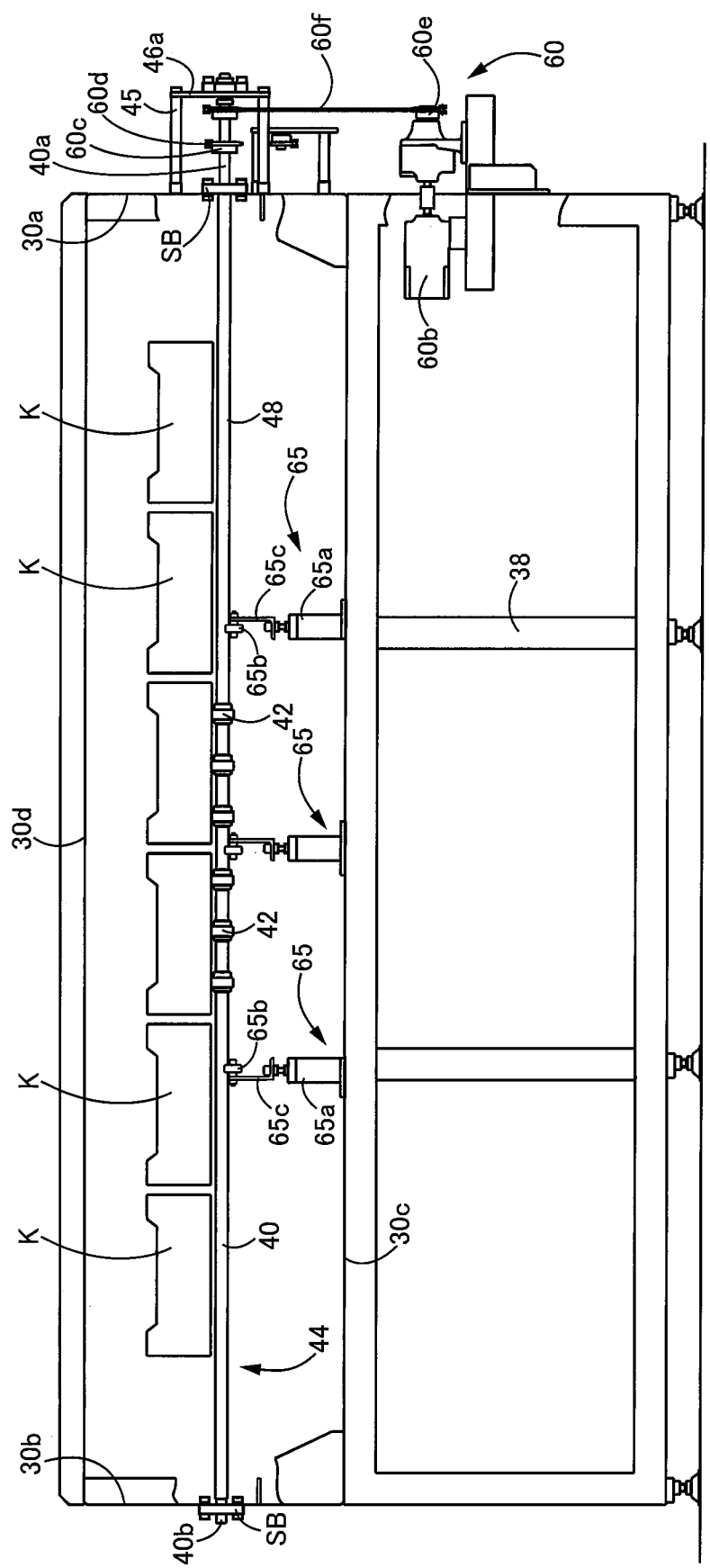
FIG. 4 is a cross sectional view taken along line IV-IV in FIG. 2.

As shown in FIG. 2 and FIG. 4, each of the first conveyor rollers 44 (eight first conveyor rollers 44 in the present embodiment) includes a first rotary shaft 40 and a plurality of first support wheels 42 (six first support wheels 42 in the present embodiment). The first rotary shaft 40, which is to be driven and rotated by the first rotation drive device 60, extends throughout the conveying path H in the width direction of the conveying path H. The first support wheels 42 are disposed on a longitudinally central portion of the first rotary shaft 40 and located in a central portion of the conveying path H, so as to support ones of the objects K that form at least one central line of the at least three lines. Each of the first support wheels 42 has an annular shape with a diameter larger than a diameter of the first rotary shaft 40, and is made of a. ceramic material such as alumina, SiC, mullite, codeine, spinel codeine, magnesia and zirconia.

As shown in FIG. 3, a pair of side plates 46a, 46b are fixed to the pair of side walls 30a, 30b through respective spacers 45, such that each of the side plates 46a, 46b is located outside a corresponding one of the side walls 30a, 30b and is held in parallel to the corresponding one of the side walls 30a, 30b. The first rotary shaft 40 has longitudinally opposite end portions in the form of shaft end portions 40a, 40b at which the first rotary shaft 40 is rotatably supported at its longitudinally opposite end portions by the side walls 30a, 30b through respective seal bearings SB. It is noted that the shaft end portion 40a, which is one of the longitudinally opposite end portions of the first rotary shaft 40, is rotatably supported also by the side plate 46a that is one of the side plates 46a, 46b, as shown in FIG. 4.

The first rotary shaft 40 has a total axial length larger than a distance between the side walls 30a, 30b, and is rotatable supported at its longitudinally opposite end portions by the side walls 30a, 30b. Each of the side walls 30a, 30b and the side plates 46a, 46b serves as a roller support wall for rotatably holding corresponding ones of the conveyor rollers such as the first conveyor rollers 44, second conveyor rollers 52 and third conveyor rollers 58.

As shown in FIG. 2 and FIG. 3, the second conveyor rollers 52 (seven second conveyor rollers 52 in the present embodiment) include respective second rotary shafts 48 located in one of non-central portions of the conveying path H (which is located on right side of the above-described central portion of the conveying path H as seen in FIG. 2 and FIG. 3 in the present embodiment). Each of the second rotary shafts 48 is located between corresponding adjacent two of the first rotary shafts 40 in the conveying direction Al, and is provided with a plurality of second support wheels 50 (eight second support wheels 50 in the present embodiment) so as to support ones of the objects K that form at least one non-central line (which consist of two lines located on the right side of the above-described central line as seen in FIG. 2 and FIG. 3 in the present embodiment). Each of the second support wheels 50 has an annular shape with a diameter larger than a diameter of the second rotary shaft 48, and is made of a ceramic material such as alumina, SiC, mullite, codelite, spinel codelite, magnesia and zirconia.

Each second rotary shaft 48 has an axial end portion in the form of a shaft end portion 48a at which the second rotary shaft 48 is rotatably supported by the side wall 30a and the side plate 46a through a seal bearing SB and a bearing (not shown), and another axial end portion in the form of a shaft end portion 48b that is a free end portion, as shown in FIG. 3. The second rotary shaft 48 has a total axial length smaller than a half of the total axial length of the first rotary shaft 40, and is rotatably supported in a cantilever manner by the side wall 30a and the side plate 46a.

As shown in FIG. 2 and FIG. 3, the third conveyor rollers 58 (seven third conveyor rollers 58 in the present embodiment) include respective third rotary shafts 54 located in the other of the non-central portions of the conveying path H (which is located on left side of the above-described central portion of the conveying path H as seen in FIG. 2 and FIG. 3 in the present embodiment). Each of the third rotary shafts 54 is coaxial with a corresponding one of the second rotary shafts 48, so as to be located between corresponding adjacent two of the first rotary shafts 40 in the conveying direction A1. Each of the third rotary shafts 54 is provided with a plurality of third support wheels 56 (eight third support wheels 56 in the present embodiment) so as to support ones of the objects K that form another at least one non-central line (which consist of two lines located on the left side of the above-described central line as seen in FIG. 2 and FIG. 3 in the present embodiment). Each of the third support wheels 56 has an annular shape with a diameter larger than a diameter of the third rotary shaft 54, and is made of a ceramic material such as alumina, SiC, mullite, codelite, spinel codelite, magnesia and zirconia.

Each third rotary shaft 54 has an axial end portion in the form of a shaft end portion 54b at which the third rotary shaft 54 is rotatably supported by the side wall 30b and the side plate 46b through a seal bearing SB and a bearing (not shown), and another axial end portion in the form of a shaft end portion 54a that is a free end portion. The third rotary shaft 54 has a total axial length smaller than a half of the total axial length of the first rotary shaft 40, and is rotatably supported in a cantilever manner by the side wall 30b and the side plate 46b, as shown in FIG. 3.

Since the first, second and third support wheels 42, 50, 56 of the first, second and third rotary shafts 40, 48, 54 are made of ceramic materials as the objects K, a very small amount of ceramic powder could be generated when they are brought into contact with the objects K. However, since metal powder is not generated, it is possible to avoid metal contamination of the heat treatment material (such as the dielectric body, the chip condenser including dielectric bodies and electrodes that are laminated and the electrode material of the lithium-ion battery) that is stored in each of the objects K.

As shown in FIG. 2 and FIG. 6, the first rotation drive device 60 rotates the plurality of first conveyor rollers 44 in synchronization with one another, by driving a projection portion of the shaft end portion 40a of each of the first rotary shafts 40, wherein the projection portion of the shaft end portion 40a projects out from a widthwise end of the conveying path H so as to be located outside the side wall 30a.

The first rotation drive device 60 includes a first reducer-built-in electric motor 60b, a plurality of sprockets 60c having the same diameters and fitted on the respective projection portions of the shaft end portions 40a, a synchronization chain 60d wrapped around the sprockets 60c, a pair of sprockets 60e fitted on one of the projection portions of the shaft end portions 40a and an output shaft of the first reducer-built-in electric motor 60b, and a drive chain 60f wrapped around the sprockets 60e, so as to drive and rotate the plurality of first rotary shafts 40 in synchronization with one another.

As shown in FIG. 2 and FIG. 6, the second rotation drive device 62 rotates the plurality of second conveyor rollers 52 in synchronization with one another, by driving a projection portion of the shaft end portion 48a of each of the second rotary shafts 48, wherein the projection portion of the shaft end portion 48a projects out front the above-described widthwise end of the conveying path H so as to be located outside the side wall 30a. The second rotation drive device 62 includes a second reducer-built-in electric motor 62b, a plurality of sprockets 62c having the same diameters and fitted on the respective projection portions of the shaft end portions 48a, a synchronization chain 62d wrapped around the sprockets 60c, a pair of sprockets 62e fitted on a projection portion of a shaft end portion of the downstream-side conveyor roller 18b and an output shaft of the second reducer-built-in electric motor 62b, a drive chain 62f wrapped around the sprockets 62e, a pair of sprockets 62g fitted on the projection portion of the shaft end portion of the downstream-side conveyor roller 18b and one of the projection portions of the shaft end portions 48a, and a drive chain 62h wrapped around the sprockets 62g, so as to drive and rotate the plurality of second rotary shafts 48 in synchronization with one another.

As shown in FIG. 2 and FIG. 6, the third rotation drive device 64 rotates the plurality of third conveyor rollers 58 in synchronization with one another, by driving a projection portion of the shaft end portion 54b of each of the third rotary shafts 54, wherein the projection portion of the shaft end portion 54b projects out from another widthwise end of the conveying path H so as to be located outside the side wall 30b. As shown in FIG. 6, the third rotation drive device 64 includes a third reducer-built-in electric motor 64b, a plurality of sprockets 64c having the same diameters and fitted on the respective projection portions of the shaft end portions 54b, a synchronization chain 64d wrapped around the sprockets 64c, a pair of sprockets 64e fitted on one of the projection portions of the shaft end portions 54b and an output shaft of the third reducer-built-in electric motor 64b, and a drive chain 64f wrapped around the sprockets 64e, so as to drive and. rotate the plurality of third rotary shafts 54 in synchronization with one another.

As shown in FIG. 3 and FIG. 4. the first rotation drive device 60, second rotation drive device 62 and third rotation drive device 64 have the chains and sprockets, so that they are likely to generate a small amount of metal powder (particles) that could cause the metal contamination of the heat treatment material. However, in the present embodiment, for avoiding or suppressing the metal contamination of the heat treatment material, the first rotation drive device 60 is configured to drive the projection portion of the shaft end portion 40a of each of the first rotary shafts 40, which projects out from the widthwise end of the conveying path H so as to be located outside the side wall 30a, the second rotation drive device 62 is configured to drive the projection portion of the shaft end portion 48a of each of the second rotary shafts 48, which projects out from the widthwise end of the conveying path H so as to be located outside the side wall 30a, and the third rotation drive device 64 is configured to drive the projection portion of the shaft end portion 54b of each of the third rotary shafts 54, which projects out from the above-described another widthwise end of the conveying path H so as to be located outside the side wall 30b. Further, the first, second and third rotation drive devices 60, 62, 64 are located in respective positions which are away from the conveying path H and the side wall 30a or side wall 30b, and which are away from an inside of the hood 30 having a high temperature. This arrangement provides durability and eliminates need of using a cooling device.

As shown in FIG. 4, each of the first rotary shafts 40 is rotatably supported at the shaft end portions 40a, 40b as its longitudinally opposite end portions by the side walls 30a, 30b and the side plate 46a, and is rotatably supported at its longitudinally central portion by at least one first roller-type support device 65 (three first roller-type support devices 65 in the present embodiment). Further, as shown in FIG. 3, each of the second rotary shafts 48 is rotatably supported at the shaft end portion 48a as one of its longitudinally opposite end portions in the cantilever manner by the side wall 30a and the side plate 46a, and is rotatably supported at the shaft end portion (free end portion) 48b as the other of its longitudinally opposite end portions by at least one second roller-type support device 66 (two second roller-type support devices 66 in the present embodiment). Still further, as shown in FIG. 3, each of the third rotary shafts 54 is rotatably supported at the shaft end portion 54b as one of its longitudinally opposite end portions in the cantilever manner by the side wall 30b and the side plate 46b, and is rotatably supported at the shaft end portion (free end portion) 54a as the other of its longitudinally opposite end portions by at least one third roller-type support device 67 (two third. roller-type support devices 67 in the present embodiment). Owing to these arrangements using the first, second and third roller-type support devices 65, 66, 67, it is possible to suppress deflection of the longitudinal central portion of each first rotary shaft 40, deflection of the shaft end portion (free end portion) 48b of each second rotary shaft 48 and deflection of the shaft end portion (free end portion) 54a of each third rotary shaft 54, whereby deviation of the objects K from the conveying direction A1 due to the deflections can be suppressed.

As shown in FIG. 3 and FIG. 4, each of the first roller-type support devices 65 includes a pedestal 65a, a pair of rollers 65b which are disposed on the pedestal 65a and which are spaced apart from each other by a predetermined distance in a horizontal direction, and a roller-support bracket 65c that supports the pair of rollers 65b such that axes of the respective rollers 65b are parallel to each other, and rotatably supports a corresponding one of the first rotary shafts 40 that is in contact with the pair of rollers 65b. Similarly, each of the second roller-type support devices 66 includes a pedestal 66a, a pair of rollers 66b and a roller-support bracket 66c, and rotatably supports a corresponding one of the second rotary shafts 48. Similarly, each of the third roller-type support devices 67 includes a pedestal 67a, a pair of rollers 67b and a roller-support bracket 67c, and rotatably supports a corresponding one of the third rotary shafts 54.

As shown in FIG. 1 and FIG. 6, the roller conveyor device 10 include a control device 68 that is an electronic control device, for example, The control device 68 is configured to control the first, second and third reducer-built-in electric motor 60b, 62b, 64b of the respective first, second and third rotation drive devices 60, 62, 64 such that the objects K forming at least three lines (six lines in the present embodiment) are conveyed on the conveying path H, basically, at the same speed at which they are conveyed in the furnace body 14. Further, at the same time, the control device 68 is configured to perform a correction control for correcting, as needed, a rotational speed of the first reducer-built-in electric motor 60b for driving the first conveyor rollers 44, a rotational speed of the second reducer-built-in electric motor 62b for driving the second conveyor rollers 52 and rotational speed of the third reducer-built-in electric motor 64b for driving the third conveyor rollers 58, such that each at least three objects K (each six objects K in the present embodiment), which are arranged in the same row and which are adjacent to one another in the direction orthogonal to the conveying direction A1, are substantially synchronized with positional deviation among them being minimized in the conveying direction A1, namely, such that each at least one object K (each two objects K in the present embodiment) conveyed by the first conveyor rollers 44 of the three-line conveyor 20, a corresponding at least one object K (corresponding two objects K in the present embodiment) conveyed by the second conveyor rollers 52 of the three-line conveyor 20 and a corresponding at least one object K (corresponding two objects K in the present embodiment) conveyed by the third conveyor rollers 58 of the three-line conveyor 20 are substantially synchronized with positional deviation among them being minimized in the conveying direction A1.

The control device 68 performs the correction control in a manner for reducing a difference among a position of each at least one object K (each two objects K in the present embodiment) conveyed by the first conveyor rollers 44, a position of a corresponding at least one object K (corresponding two objects K in the present embodiment) conveyed by the second conveyor rollers 52 and a position of a corresponding at least one object K (corresponding two objects K in the present embodiment) conveyed by the third conveyor rollers 58 in the conveying direction A1, wherein the positions are to be detected by three sensors (not shown) that are provided in a start end portion of the three-line conveyor 20.

As shown in FIG. 2 and FIG. 6, the separator conveyor 22 is provided on a downstream side of the three-line conveyor 20 in the conveying direction A1. The separator conveyor 22 includes a plurality of separator conveyor rollers 70 (four separator conveyor roller 70 in the present embodiment) and a separator rotation drive device 72 having substantially the same construction as the above-described first rotation drive device 60. Like the upstream-side furnace-speed conveyor roller 18a, each of the separator conveyor rollers 70 includes a rotary shafts 70a that is rotatably supported at its longitudinally opposite end portions by the side walls 30a, 30b through respective seal bearings SB, and a plurality of support wheels 70b (22 support wheels 70b) disposed on each of the rotary shafts 70a.

The plurality of separator conveyor rollers 70 of the separator conveyor 22 are driven by the separator rotation drive device 72 that is controlled by the control device 68, so as to be rotated in synchronization with one another, such that each at least three objects K (each six objects K in the present embodiment), which are arranged in the same row (extending in the widthwise direction of the conveying path H) and which have been conveyed by the three-line conveyor 20, are conveyed at the furnace speed until reaching a certain position, and then is conveyed by the separator conveyor 22 at a higher speed than by the three-line conveyor 20 after having reached the certain position whereby the each at least three objects K arranged in the same row are separated from the objects K that follow them.

As shown in FIG. 2 and FIG. 6, the take-out conveyor 23 is provided on a downstream side of the separator conveyor 22 in the conveying direction A1. The take-out conveyor 23 includes a plurality of take-out convey rollers 74 (six take-out convey rollers 74 in the present embodiment) and a take-out rotation drive device 76 for driving the take-out conveyor rollers 74 such that each at least three objects K, which are arranged in the same row and which have been separated from the objects K that follow them, are conveyed at a higher speed than the furnace speed. Like the upstream-side furnace-speed conveyor roller 18a, each of the take-out conveyor rollers 74 includes a rotary shafts 74a that is rotatably supported at its longitudinally opposite end portions by the side walls 30a, 30b through respective seal bearings SB, and a plurality of support wheels 74b (22 support wheels 74b) disposed on each of the rotary shafts 74a. The take-out conveyor 23 is controlled by the control device 68 such that each at least three objects K, which have been aligned in the row extending in the direction orthogonal to the conveying direction A1 by the conveyed-object aligning device 28, are conveyed at a higher speed than the furnace speed, so as to be moved into the replacement chamber 32.

Figure 5:
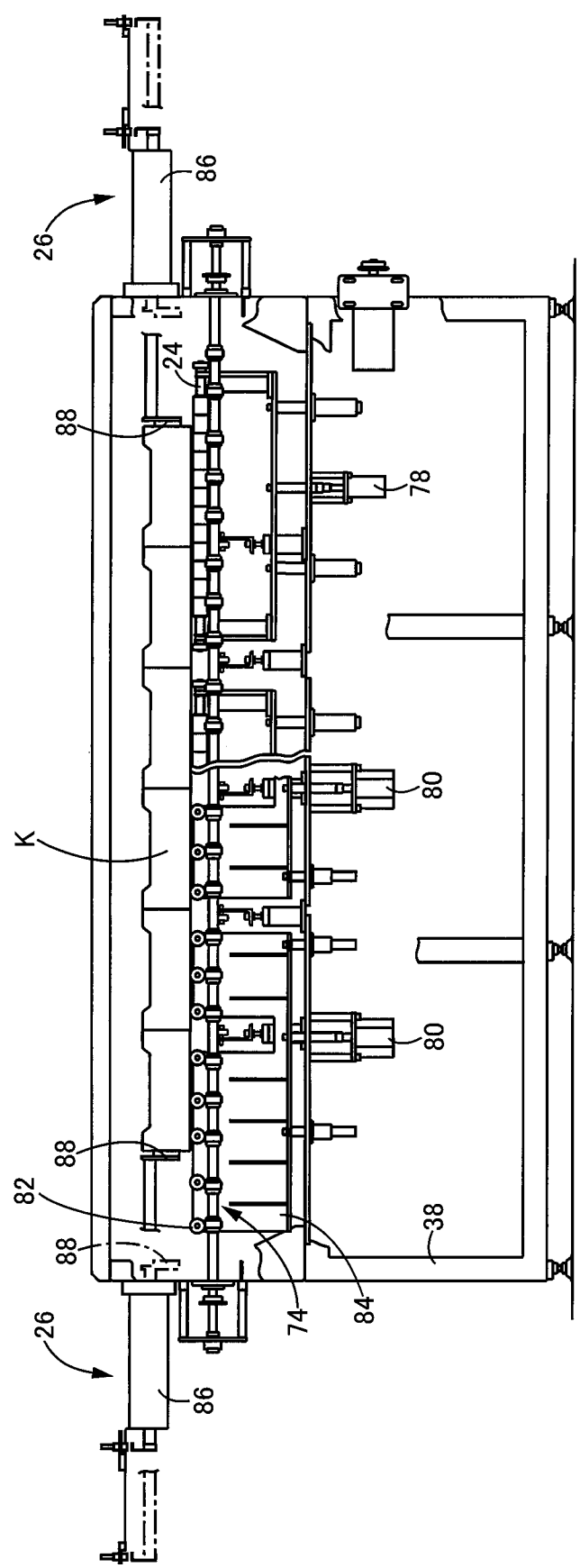
FIG. 5 is a cross sectional view taken along line V-V in FIG. 2.

As shown in FIG. 2 and FIG. 5, the conveyed-object aligning device 28 includes the stopper 24 and the truing-up device 26. The stopper 24 is vertically movable by vertical actuators 78 such as electric cylinders and pneumatic cylinders, so as to be positioned selectively in an upper position and a lower position, such that the stopper 2.4 inhibits movement of the objects K in the conveying direction A1 when being positioned in the upper position. The truing-up device 26 includes an object elevator device 84, a pair of horizontal cylinders 86 fixed to the respective side walls 30a, 30b, and a pair of clamp devices 88. The object elevator device 84 is movable by vertical actuators 80 such as electric cylinders and pneumatic cylinders, so as to be positioned selectively in an upper position and a lower position. The object elevator device 84 includes a plurality of support rollers 82 for supporting the objects K such that the supported objects K are movable in the direction orthogonal to the conveying direction A1. The pair of clamp devices 88 are horizontally movable by the respective horizontal cylinders 86 so as to cooperate to clamp the objects K supported by the object elevator device 84, from respective directions orthogonal to the conveying direction A1. The conveyed-object aligning device 28 is controlled by the control device 68, so as to cause each at least three objects K of the same row, which have been brought into contact with the stopper 24 and lifted up from the conveying path H, to be aligned precisely in the row, with the each at least three objects K being in close contact with one another.

As shown in FIG. 2, the sending-out conveyor 34 is provided on a downstream side of the take-out conveyor 23 in the conveying direction A1. The sending-out conveyor 34 includes a plurality of sending-out conveyor rollers 94 (eight sending-out conveyor rollers 94 in the present embodiment) and a send-out rotation drive device (not shown) configured to drive and rotate the sending-out conveyor rollers 94 such that each at least three objects K, which are aligned in the same row and which have been separated from the objects K that follow them, are conveyed at a higher speed than the furnace speed. Like the upstream-side furnace-speed conveyor roller 18a, each of the sending-out conveyor rollers 94 includes a rotary shafts 90 that is rotatably supported at its longitudinally opposite end portions by the side walls 32a, 32b and side walls (not shown) through respective seal bearings SB, and a plurality of support wheels 92 (22 support wheels 92) disposed on each of the rotary shafts 90.

The sending-out conveyor 34 is controlled by the control device 68 such that each at least three objects K, which have been aligned in the row extending in the direction orthogonal to the conveying direction A1 by the conveyed-object aligning device 28, are conveyed at a higher speed than the furnace speed, so as to be moved onto the transfer conveyor 36 from the replacement chamber 32 in which the atmosphere gas (as in the furnace) is replaced by the atmosphere.

As shown in FIG. 2, the transfer conveyor 36 is a chain conveyor that includes conveyor rails 36a extending in the direction orthogonal to the conveying direction A1, conveyor chains 36b held by the respective conveyor rails 36a and a chain drive device (not shown). The transfer conveyor 36 is controlled by the control device 68, and is configured, when each at least three objects K aligned in the row have been moved by the sending-out conveyor 34 to reach the transfer conveyor 36, to transfer the each at least three objects K aligned in the row, in the direction orthogonal to the conveying direction A1, to an inverse device (not shown), for example. In the inverse device, the each at least three objects K, which have been transferred by the transfer conveyor 36, are inverted one by one.

In the three-line conveyor 20 of the roller conveyor device 10 constructed as described above, when each at least three objects K that are arranged in the same row have been conveyed from the exit of the furnace body 14 in the predetermined furnace speed, at least one of the each at least three objects K, which forms the above-described at least one central line (first line), are conveyed by the first conveyor rollers 44 of the three-line conveyor 20, at least one of the each at least three objects K, which forms the above-described at least one non-central line (second line) located on the right side of the at least one central line as seen in FIG. 2 and FIG. 3, are conveyed by the second conveyor rollers 52 of the three-line conveyor 20, and at least one of the each at least three objects K, which forms the above-described another at least one non-central line (third line) located on the left side of the at least one central line as seen in FIG. 2 and FIG. 3, are conveyed by the third conveyor rollers 58 of the three-line conveyor 20. Specifically, in the present embodiment, the at least three objects K consist of six objects K, the at least one of the each at least three objects K, which forms the above-described at least one central line, consists of two of the six objects K, the at least one of the each at least three objects K, which forms the above-described at least one non-central line, also consists of two of the six objects K, and the at least one of the each at least three objects K, which forms the above-described another at least one non-central line, also consists of two of the six objects K.

Each of the in-furnace conveyor rollers 16 in the heating furnace 12 tends to be downwardly curved at its longitudinally central portion, particularly, in a high-temperature heating region, so that, when each at least three objects K that are arranged in the same row have been conveyed from the exit of the furnace body 14, at least one of the each at least three objects K, which forms the above-described at least one central line, tends to be deviated, in the conveying direction A1 from the others of the each at least three objects K. which form the above-described at least one non-central line and another at least one non central line. If this tendency is large, the deviation could be beyond an aligning capacity of the conveyed-object aligning device 28, thereby making it difficult to accommodate all of the at least three objects K of the same row, into the replacement chamber 32.

However, in the present embodiment, the control device 68 performs the correction control in a manner for reducing a difference among a position of each at least one object K (each two objects K in the present embodiment) conveyed by the first conveyor rollers 44, a position of a corresponding at least one object K (corresponding two objects K in the present embodiment) conveyed by the second conveyor rollers 52 and a position of a corresponding at least one object K (corresponding two objects K in the present embodiment) conveyed by the third conveyor rollers 58 in the conveying direction A1, wherein the positions are to be detected by the three sensors (not shown) that are provided in an upstream portion of the three-line conveyor 20. Owing to this arrangement, it is possible to reduce the difference among each at least three objects K forming the same row, in terms of position in the conveying direction A1, in stage of conveyance of the objects K by the three-line conveyor 20.

Further, in the three-line conveyor 20, the diameter of the first support wheels 42 of the first conveyor rollers 44 is larger than the diameter of the second support wheels 50 of the second conveyor rollers 52 and the diameter of the third support wheels 56 of the third conveyor rollers 58. Owing to this arrangement, the objects K conveyed by the second and third conveyor rollers 52, 58 tend to be separated away from the objects K conveyed by the first conveyor rollers 44, so that it is possible to avoid the objects K conveyed by the first conveyor rollers 11, from interfering with the objects K conveyed by the second and third conveyor rollers 52, 58.

Further, in the stage of conveyance of the objects K by the three-line conveyor 20 at the speed substantially same as the furnace speed, basically, the objects K forming each row are relatively close to the objects forming rows that are adjacent to the each row in the conveying direction A1. However, in the subsequent stage of conveyance of the objects K by the separator conveyor 22, the objects K are conveyed at a higher speed than the furnace speed, so that, when the objects K forming each row reaches the separator conveyor 22, the objects K forming the each row reaches are separated from the objects K forming a row following the each row in the conveying direction A1, whereby a distance from the objects K forming the each row to the objects K forming the following row in the conveying direction A1 is increased. The objects K forming the each row, whose distance to the objects K forming the following row has been increased in the conveying direction A1, are aligned accurately in a row while being in close contact with one another in the direction orthogonal to the conveying direction A1, by the stopper 24 and the truing-up device 26 of the conveyed-object aligning device 28. The objects K, which have been aligned accurately in the row, are moved into the replacement chamber 32 by the take-out conveyor 23. Then, when the atmosphere gas has been replaced by the atmosphere in the replacement chamber 32, the objects K aligned in the row are sent out from the replacement chamber 32 to an end portion of the transfer conveyor 36 by the sending-out conveyor 34.

The distance of the objects K forming each row to the objects K forming the following row requires to be increased by the separator conveyor 22, for enabling the objects K forming the each row, to be aligned accurately in the row by the conveyed-object aligning device 28 and to be accommodated into the replacement chamber 32. Owing to the presence of the separator conveyor 22, an interval distance between the objects K in the heating furnace 12 can be set to a small value and accordingly a total length of the heating furnace 12 can be made small.

The replacement chamber 32 has a volume that is minimized within a range that allows the objects K to be aligned in the row and to be accommodated into the replacement chamber 32, so as to maximize efficiency of consumption of gas that forms the gas atmosphere. The stopper 24 and the truing-up device 26 of the conveyed-object aligning device 28, by which the objects K forming the each row are aligned accurately in the row while being in close contact with one another in the direction orthogonal to the conveying direction A1, contribute to minimize the volume of the replacement chamber 32.

Further, the hood 30 is provided with the seal bearings SB for receiving the first rotary shafts 40, second rotary shafts 48, third rotary shafts 54 and rotary shafts 70a that pass through the side wall 30a, 30b of the hood 30, and is air-tightly connected to the exit of the furnace body 14 and the entrance of the replacement chamber 32. Thus, the hood 30 has a function of keeping the objects K carried out from the heating furnace 12, under the gas atmosphere as in the heating furnace 12, until the objects K are moved into the replacement chamber 32. Owing to this arrangement by which the gas atmosphere is established in the hood 30 as well as in heating furnace 12, it is possible to increase heat treatment capacity of the heating furnace 12 for the heat treatment material stored in each of the objects K under the gas atmosphere.

Moreover, the hood 30 has a function of maintaining the temperature of the objects K carried out from the heating furnace 12. Therefore, it is possible to take out the heat treatment material stored in each of the objects K in a relatively high temperature state, then fill the each of the objects K in the high temperature state with a new heat treatment material, and carry it to the entrance of the heating furnace 12. Thus, it is possible to increase thermal efficiency, without the objects K having large specific heat and heat capacity being cooled to a low temperature. It is noted that the entrance shutter 32e of the replacement chamber 32 corresponds to a downstream-side shutter of the hood 30 in the conveying direction A1.

In the roller conveyor device 10 of the present embodiment, each of the first, second and third rotary shafts 40, 48, 54 includes the shaft end portion having the projection portion that projects out from the conveying path H in the widthwise direction, wherein the three-line conveyor 20 includes the first rotation drive device 60 configured to drive the projection portion of the shaft end portion 40a of each of the first rotary shafts 40 such that the first rotary shafts 40 are rotated in synchronization with each other, the second rotation drive device 62 configured to drive the projection portion of the shaft end portion 48a of each of the second rotary shafts 48 such that the second rotary shafts 48 are rotated in synchronization with each other, and the third rotation drive device 64 configured to drive the projection portion of the shaft end portion 54b of each of the third rotary shafts 54 such that the third rotary shafts 54 are rotated in synchronization with each other. Thus, the projection portions of the shaft end portions of the first, second and third rotary shafts 40, 48, 54, which project out from the conveying path H in the widthwise direction, so that the first, second and third rotary shafts 40, 48, 54 are driven and rotated by the first, second and third rotation drive devices 60, 62, 64 in respective positions that are distant from the conveying path H in the widthwise direction, thereby advantageously suppressing contamination of the objects K, which could be caused due to metallic fine powders.

In the roller conveyor device 10 of the present embodiment, the diameter of each of the first support wheels 42 is larger than the diameter of each of the second support wheels 50 and the diameter of each of the third support wheels 56. Owing to this arrangement, the objects K conveyed by the second and third conveyor rollers 52, 58 tend to be separated away from the objects K conveyed by the first conveyor rollers 44, so that it is possible to avoid the objects K conveyed by the first conveyor rollers 44, from interfering with the objects K conveyed by the second and third conveyor rollers 52, 58.

In the roller conveyor device 10 of the present embodiment, the pair of roller support walls (side walls 30a, 30b) are fixedly provided on the respective opposite sides of the conveying path H in the widthwise direction, wherein each of the first and second rotary shafts 40, 48 passes through the one (side wall 30a) of the roller support walls, such that the projection portion of the shaft end portion of each of the first and second rotary shafts 40, 48 is located outside the one (side wall 30a) of the roller support walls in the widthwise direction, and wherein each of the third rotary shafts 54 passes through the other (side wall 30b) of the roller support walls, such that the projection portion of the shaft end portion of each of the third rotary shafts 54 is located outside the other (side wall 30b) of the roller support walls in the widthwise direction. Owing to this arrangement, the first, second and third rotary shafts 40, 48, 54 are driven and rotated by the first, second and third rotation drive devices 60, 62, 64 in respective positions that are distant and separated by a corresponding one of the roller support walls (side walls 30a, 30b) from the conveying path H in the widthwise direction, thereby advantageously suppressing contamination of the objects K, which could be caused due to the metallic fine powders.

In the roller conveyor device 10 of the present embodiment, each of the first rotary shafts 40 is rotatably supported, at its longitudinally opposite end portions (shaft end portions 40a, 40b), by the roller support walls (side walls 30a, 30b), and is rotatably supported at its longitudinally central portion by the first roller-type support device 65. Each of the second rotary shafts 48 is rotatably supported, at one (shall end portion 48a) of its longitudinally opposite end portions, by the one (side wall 30a) of the roller support walls, and is rotatably supported at the other (shall end portion 48b) of its longitudinally opposite end portions by the second roller-type support device 66, without the each of the second rotary shafts 48 being supported at the other (shaft end. portion 48b) of its longitudinally opposite end portions by the other (side wall 30b) of the roller support walls. Each of the third rotary shafts 54 is rotatably supported, at one (shaft end portion 54b) of its longitudinally opposite end portions, by the other (side walls 30b) of the roller support walls, and is rotatably supported at the other (shaft end portion 54a) of its longitudinally opposite end portions by the third roller-type support device 67, without the each of the third rotary shafts 54 being supported at the other (shaft end portion 54a) of its longitudinally opposite end portions by the one (side wall 30a) of the roller support walls. Owing to this arrangement using the first, second and third roller-type support devices 65, 66, 67, it is possible to suppress deflection of the above-described other (shaft end portion 48b) of the longitudinally opposite end portions of each of the second rotary shafts 48, deflection of the above-described other (shaft end portion 54a) of the longitudinally opposite end portions of each of the third rotary shafts 54 and deflection of the longitudinally central portion of each of the first rotary shafts 40 that are longer than each of the second and third rotary shafts 48, 54, whereby deviation of the conveyed objects K from the conveying direction A1 due to the deflections can be suppressed.

In the roller conveyor device 10 of the present embodiment, the separator conveyor 22 is provided to separate the objects K that have been conveyed by the three-line conveyor 20, by conveying the objects K at the speed higher than the speed at which the objects K have been conveyed by the three-line conveyor 20; and the conveyed-object aligning device 28 is provided to cause the objects K conveyed by the separator conveyor 22, to be brought into contact with the stopper 24, so as to align the objects K in the row extending in the direction orthogonal to the conveying direction A1. Owing to this arrangement, the conveyed objects K are aligned in the row extending in the direction orthogonal to the conveying direction A1, for example, before being accommodated into the replacement chamber 32.

In the roller conveyor device 10 of the present embodiment, each of the objects K is the saggar box which is made of the ceramic material and which stores the heat treatment material therein, wherein each of the first, second and third support wheels 42, 50, 56 is made of the ceramic material. Therefore, with the contact of the objects K with the support wheels 42, 50, 56, only inorganic fine powders could be generated so that it is possible to avoid the objects K and the heat treatment material stored in each of the objects K, from being contaminated by metallic fine powders.

In the roller conveyor device 10 of the present embodiment, the control device 68 is provided to control the first, second and third rotation drive devices 60, 62, 64 for conveying the objects K that form the at least three lines on the conveying path H, such that the positional difference between each adjacent ones of the objects K, which are adjacent to each other in the direction orthogonal to the conveying direction A1, in the conveying direction A1 is reduced. Owing to provision of the control device 68, even if the objects K are caused to meander, namely, are deviated from the conveying direction A1 toward the direction orthogonal to the conveying direction A1, due to deflections of the in-furnace conveyor roller 16 in the heating furnace 12 located in an upstream side of the three-line conveyor 20 in the conveying direction A1, the positional difference between each adjacent ones of the objects K adjacent to each other in the direction orthogonal to the conveying direction A1 is reduced whereby the each adjacent ones of the objects K are aligned in the row extending in the direction orthogonal to the conveying direction A1.

While the invention has been described in detail with reference to the drawings, it is to be understood that the invention may be embodied also in other forms.

For example, in the above-described embodiment, the three-line conveyor 20 is used to covey the objects K forming a plurality of lines, wherein each of the objects K does not necessarily have to be the saggar box but may be a different object such as a sintered alloy molded body.

Further, in the above-described embodiment, the heating furnace 12 may be configured to perform the heat treatment with the atmosphere, too. In this case, the separator conveyor 22, the take-out conveyor 23 and the hood 30 may be removed, and the conveyed-object aligning device 28 and the replacement chamber 32 also may be removed.

Further, in the above-described embodiment, the objects K are conveyed while forming six lines. However, the number of lines formed by the objects K during the conveyance may be three, for example. Further, the roller conveyor device 10 may be used for a conveyance other than the conveyance of the objects K that has been sent from the heating furnace 12.

While the preferred embodiment of the present invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

10: roller conveyor device
20: three-line conveyor
22: separator conveyor
24: stopper
28: conveyed-object aligning device
30*a*: side wall (roller support wall)
30*b*: side wall (roller support wall)
40: first rotary shaft
40*a*: shaft end portion
40*b*: shaft end portion
42: first support wheel
44: first conveyor roller
48: second rotary shaft
48*a*: shaft end portion
48*b*: shaft end portion
50: second support wheel
52: second conveyor roller
54: third rotary shaft
54*a*: shaft end portion
54*b*: shaft end portion
56: third support wheel
58: third conveyor roller
60: first rotation drive device
62: second rotation drive device
64: third rotation drive device
65: first roller-type support device
66: second roller-type support device
67: third roller-type support device
68: control device
A1: conveying direction
H: conveying path
K: conveyed object

What is claimed is:

1. A roller conveyor device comprising:
a three-line conveyor including a plurality of conveyor rollers that are arranged in a conveying direction so as to define a conveying path, the three-line conveyor being configured to convey a plurality of objects placed on the conveyor rollers such that the plurality of objects are conveyed in the conveying direction while forming at least three lines each extending in the conveying direction, and such that the at least three lines include at least one central line, at least one non-central line located on one of opposite sides of the at least one centerline in a widthwise direction of the conveying path, and another at least one non-central line located on the other of the opposite sides of the at least one central line in the widthwise direction of the conveying path,
wherein the plurality of conveyor rollers include a plurality of first conveyor rollers including respective first rotary shafts that extend in the widthwise direction of the conveying path, each of the first rotary shafts being provided with a plurality of first support wheels which are disposed on a longitudinally central portion of the each of the first rotary shafts and which are located in a central portion of the conveying path between non-central portions of the conveying path in the widthwise direction of the conveying path, so as to support ones of the objects that form the at least one central line, wherein the plurality of conveyor rollers include a plurality of second conveyor rollers including respective second rotary shafts which extend in the widthwise direction of the conveying path and which are interposed between the first rotary shafts in the conveying direction, each of the second rotary shafts being provided with a plurality of second support wheels that are located in one of the non-central portions of the conveying path in the widthwise direction of the conveying path, so as to support ones of the objects that form the at least one non-central line, wherein the plurality of conveyor rollers include a plurality of third conveyor rollers including respective third. rotary shafts which extend in the widthwise direction of the conveying path and which are interposed between the first rotary shafts in the conveying direction, each of the third rotary shafts being provided with a plurality of third support wheels that are located in the other of the non-central portions of the conveying path in the widthwise direction of the conveying path, so as to support ones of the objects that form the another at least one non-central line, wherein each of the first, second and third rotary shafts includes a shaft end portion having a projection portion that projects out from the conveying path in the widthwise direction, and wherein the three-line conveyor further includes a first rotation drive device configured to drive the projection portion of the shaft end portion of each of the first rotary shafts such that the first rotary shafts are rotated in synchronization with each other, a second rotation drive device configured to drive the projection portion of the shaft end portion of each of the second rotary shafts such that the second rotary shafts are rotated in synchronization with each other, and a third rotation drive device configured to drive the projection portion of the shaft end portion of each of the third rotary shafts such that the third rotary shafts are rotated in synchronization with each other.

2. The roller conveyor device according to claim 1, wherein the plurality of first support wheels, which are disposed on each of the first rotary shafts of the first conveyor rollers, are spaced apart from each other, and each of the first support wheels has a diameter larger than a diameter of the each of the first rotary shafts, wherein the plurality of second support wheels, which are disposed on each of the second rotary shafts of the second conveyor rollers, are spaced apart from each other, and each of the second support wheels has a diameter larger than a diameter of the each of the second rotary shafts, wherein the plurality of third support wheels, which are disposed on each of the third rotary shafts of the third conveyor rollers, are spaced apart from each other, and each of the third support wheels has a diameter larger than a diameter of the each of the third rotary shafts, and wherein the diameter of each of the first support wheels is larger than the diameter of each of the second support wheels and the diameter of each of the third support wheels.

3. The roller conveyor device according to claim 1, further comprising a pair of roller support walls that are fixedly provided on respective opposite sides of the conveying path in the widthwise direction, wherein each of the first and second rotary shafts passes through one of the roller support walls, such that the projection portion of the shaft end portion of each of the first and second rotary shafts is located. outside the one of the roller support walls in the widthwise direction, and wherein each of the third rotary shafts passes through the other of the roller support walls, such that the projection portion of the shaft end portion of each of the third rotary shafts is located outside the other of the roller support walls in the widthwise direction.

4. The roller conveyor device according to claim 3, wherein each of the first rotary shafts is rotatably supported, at longitudinally opposite end portions thereof one of which corresponds to the shaft end portion, by the roller support walls, and is rotatably supported at the longitudinally central portion thereof by a first roller-type support device, wherein each of the second rotary shafts is rotatably supported, at one of longitudinally opposite end portions thereof that corresponds to the shaft end portion, by the one of the roller support walls, and is rotatably supported at the other of the longitudinally opposite end portions thereof by a second roller-type support device, without the each of the second rotary shafts being supported at the other of the longitudinally opposite end portions thereof by the other of the roller support walls, and wherein each of the third rotary shafts is rotatably supported, at one of longitudinally opposite end portions thereof that corresponds to the shaft end portion, by the other of the roller support walls, and is rotatably supported at the other of the longitudinally opposite end portions thereof by a third roller-type support device, without the each of the third rotary shafts being supported at the other of the longitudinally opposite end portions thereof by the one of the roller support walls.

5. The roller conveyor device according to claim 1, further comprising:

a separator conveyor configured to separate the objects that have been conveyed by the three-line conveyor, by conveying the objects at a speed higher than a speed at which the objects have been conveyed by the three-line conveyor; and a conveyed-object aligning device configured to cause the objects conveyed by the separator conveyor, to be brought into contact with a stopper, so as to align the objects in a row extending in a direction orthogonal to the conveying direction.

6. The roller conveyor device according to claim 2, wherein each of the objects is a saggar box which is made of a ceramic material and which stores therein a material subjected to a heat treatment, and wherein each of the first, second and third support wheels is made of a ceramic material.

7. The roller conveyor device according to claim I, further comprising a control device configured to control the first, second and third rotation drive devices for conveying the objects that form the at least three lines on the conveying path, such that a positional difference between each adjacent ones of the objects, which are adjacent to each other in a direction orthogonal to the conveying direction, in the conveying direction is reduced.

8. The roller conveyor device according to claim 1,
wherein the first rotary shafts of the respective first conveyor rollers pass through the conveying path in the widthwise direction,
wherein the second rotary shafts of the respective second conveyor rollers are located on one of opposite sides of the central portion of the conveying path in the widthwise direction, and
and wherein the third rotary shafts of the respective third conveyor rollers are located on the other of the opposite sides of the central portion of the conveying path in the widthwise direction.

* * * * *